3,174,970
PREPARATION OF HYDROXY-HYDROXY-
METHYLATED STEROIDS
Georges Muller, Nogent-sur-Marne, and André Poittevin,
Les Lilas, France, assignors to Roussel-UCLAF, Paris,
France, a corporation of France
No Drawing. Filed Nov. 7, 1963, Ser. No. 322,067
Claims priority, application France, Nov. 22, 1962,
916,300
14 Claims. (Cl. 260—239.55)

This invention relates to a novel process for the preparation of hydroxy-hydroxymethylated steroids from the corresponding steroidal ketone. The invention also relates to novel hydroxy-hydroxymethylated steroids and intermediates thereof.

The reaction of ylides of sulfur with organic compounds having ketones or aldehydes activated by the presence of a nearby aromatic ring are known. However, according to the prior art, such reactions apparently could not be effected with steroidal ketones. For example, Corey et al. (J.A.C.S., vol. 84, 1962, p. 867) reported failure in attempting to react an ylide of sulfur with $\Delta^4$-cholestenone which they attributed to the reaction conditions.

It is an object of the invention to provide a novel method for the preparation of hydroxy-hydroxymethyl steroids by reacting a steroid ketone with an ylide of sulfur.

It is another object of the invention to provide novel hydroxy-hydroxymethyl steroids.

It is a further object of the invention to provide novel intermediates for hydroxy-hydroxymethyl steroids.

These and other objects and advantages of the invention will become obvious from the following detailed description.

The novel process of the invention for the preparation of hydroxy-hydroxymethyl steroids comprises reacting a steroid having at least one keto group not conjugated with a double bond with the methylide of dimethyl sulfoxonium to form the corresponding spiro-oxirane of the steroid and hydrolyzing the said spiro-oxirane, preferably under alkaline conditions, to form the corresponding hydroxy-hydroxymethylated steroid.

The reaction of the keto steroid with the methylide of dimethyl sulfoxonium is preferably effected in the same medium used to prepare the said methylide at room temperatures. The process of the invention is illustrated in the following partial flow diagram:

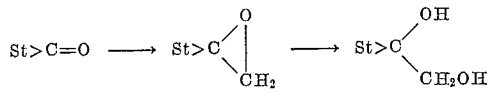

wherein St represents the remainder of the steroid molecule.

The steroids useful for the present process are steroids with at least one keto group not conjugated with a double bond and the preferred steroids are those with the keto groups in the 3-, 17- and/or 20-position. Examples of suitable steroids are 3-methoxy-$\Delta^{2,5(10)}$-estradiene-17-one, 17$\beta$-acetoxy-5$\beta$-androstane-3-one, 5$\beta$-pregnane-3$\alpha$-ol-20-one, coprostane-3-one, 5$\beta$-pregnane-17$\beta$-ol-3-one, 5$\beta$-androstane-3$\beta$-ol-17-one, 5$\alpha$-androstane-3$\beta$-ol-17-one, 5$\beta$-androstane-3$\alpha$-ol-17-one, 5$\alpha$-androstane-3$\alpha$-ol-17-one, 5$\alpha$-pregnane-3$\beta$-ol-20-one, 5$\alpha$-pregnane-3$\alpha$-ol-20-one and 5$\beta$-pregnane-3$\beta$-ol-20-one.

The hydroxy-hydroxymethyl steroids of the invention are valuable intermediate products for the preparation of other steroids. They may be converted to the corresponding formyl steroids by dehydration with acidic agents such as oxalic acid or phosphorus oxychloride by the process of United States Patent No. 3,022,324. 3-formyl-androstanes and 3-hydroxymethyl androstanes from which they are derived are known to possess anabolic and androgenic activity with a favorable ratio for the anabolic effect as shown in United States Patent No. 3,035,068. 17- or 20-formyl steroids are useful for preparing methylol steroids which possess vasodilatory activity (Bull. Soc. Chim., France, 1962, p. 1068 and C.R., vol. 254, 1962, p. 42) or for preparing 21-bis-(aminomethyl)-pregnanes which possess vasodilatory activity as described in copending, commonly assigned United States application Serial No. 297,976, filed July 26, 1963.

To prepare 17$\alpha$-hydroxymethyl-19-nor-testosterone, 3-methoxy-$\Delta^{2,5(10)}$-estradiene-17-one is reacted with the methylide of dimethyl sulfoxonium to form 3-methoxy-$\Delta^{2,5(10)}$-etsradiene-17$\beta$(1')-spiro-2'-oxirane, reacting the latter under alkaline conditions to form 3-methoxy-17$\alpha$-hydroxymethyl-$\Delta^{2,5(10)}$-estradiene-17$\beta$-ol, the latter is reacted under acidic conditions such as acetic acid to form 17$\alpha$-hydroxymethyl-$\Delta^{5(10)}$-estrene-17$\beta$-ol-3-one and then the latter is reacted under alkaline conditions to form 17$\alpha$-hydroxymethyl-$\Delta^4$-estrene-17$\beta$-ol-3-one or 17$\alpha$-hydroxymethyl-19-nor-testosterone.

In the following examples there are described several preferred embodiments to illustrate the invention. However, it should be understood that the invention is not intended to be limited to the specific embodiments.

EXAMPLE I

*Preparation of 3$\xi$-hydroxymethyl-5$\beta$-androstane-3$\xi$,17$\beta$-diol*

STEP A.—17$\beta$-ACETOXY-5$\beta$-ANDROSTANE-3-SPIRO-2'-OXIRANE 16.5 gm. of trimethyl sulfoxonium iodide were placed in suspension in 165 cc. of dimethylformamide and while agitating, 3.2 gm. of a suspension of 50% sodium hydride in oil were added thereto. The reaction mixture was allowed to stand at room temperature for a period of 15 minutes to obtain a clear yellow solution into which 5 gm. of 17$\beta$-acetoxy-5$\beta$-androstane-3-one were introduced with agitation. The steroid dissolved immediately and then needle-like crystals were formed. The reaction mixture was agitated for 10 minutes more and then 200 cc. of water and ice were added thereto. The precipitate was vacuum filtered and washed with water until neutral. The washed precipitate was taken up with methylene chloride and the methylene chloride solution was dried over magnesium sulfate and evaporated to dryness. The residue was crystallized from ethyl acetate to obtain 3.2 gm. (60% yield) of 17$\beta$-acetoxy-5$\beta$-androstane-3-spiro-2'-oxirane having a melting point of 175° C. and a specific rotation $[\alpha]_D^{20} = +23° \pm 3°$ (c.=0.5% in chloroform).

The product occurred in the form of fine colorless needles which were soluble in alcohol and chloroform and slightly soluble in ether.

*Analysis.*—$C_{22}H_{34}O_3$; molecular weight=346.49. Calculated: C, 76.26%; H, 9.89%. Found: C, 76.1%; H, 9.9%.

This compound is not described in the literature.

STEP B.—PREPARATION OF 3$\xi$-HYDROXYMETHYL-5$\beta$-ANDROSTANE-3$\xi$,17$\beta$-DIOL 1 gm. of 17$\beta$-acetoxy-5$\beta$-androstane-3-spiro-2'-oxirane, obtained in Step A, was heated for a period of 45 minutes at reflux in 10 cc. of methanol, 1 cc. of water and 1 cc. of sodium hydroxide solution. The reaction mixture was cooled and poured into water and the aqueous mixture was extracted with methylene chloride. The extract was washed with water, dried over magnesium sulfate and evaporated to dryness. The residue was crystallized from methanol to obtain 870 mg. (85% yield) of 3$\xi$-hydroxymethyl-5β-androstane-3ξ,17β-diol having a melting point of 115° C. and a specific rotation $[\alpha]_D^{20} = +16° \pm 3°$ (c.=0.5% in chloroform).

The product occurred in the form of colorless prismatic crystals and was soluble in chloroform and slightly soluble in alcohols.

*Analysis.*—$C_{20}H_{34}O_3$; molecular weight=322.47. Calculated: C, 74.49%; H, 10.63%. Found: C, 74.4%; H, 10.7%.

This compound is not described in the literature.

EXAMPLE II

*Preparation of 17α-hydroxymethyl-Δ⁴-estrene-17β-ol-3-one (17α-hydroxymethyl-19-nor-testosterone)*

STEP A.—3-METHOXY-Δ$^{2,5(10)}$-ESTRADIENE-17β(1')-SPIRO-2'-OXIRANE 110 gm. of trimethylsulfoxonium iodide were introduced into 900 cc. of dimethylformamide and 23 gm. of an oily suspension containing 50% sodium hydride were added. The reaction mixture was agitated for a period of one hour and then 30 gm. of 3-methoxy-Δ$^{2,5(10)}$-estradiene-17-one were introduced. The agitation was continued for a period of 6 hours at room temperature and thereafter the reaction mixture was allowed to stand for 16 hours. 900 cc. of saturated salt solution were added and the product obtained was vacuum filtered, washed with water and thereafter dissolved in 400 cc. of ether. The solution was decanted, dried over magnesium sulfate and evaporated to dryness under vacuum. The raw residue after several fractional crystallizations from methanol and from isopropyl ether gave 7.88 (25% yield) gm. of 3-methoxy-Δ$^{2,5(10)}$-estradiene-17β(1')-spiro-2'-oxirane having a melting point of 128–130° C. and a specific rotation $[\alpha]_D^{20} = +113°$ (c.=0.5% in dioxane) after the product was crystallized from isopropyl ether.

The product occurred in the form of crystals which were slightly soluble in alcohol, soluble in ether and very soluble in acetone, benzene and chloroform.

*Analysis.*—$C_{20}H_{28}O_2$: molecular weight=300.42. Calculated: C, 79.95%; H, 9.4%. Found: C, 80.1%; H, 9.5%.

This compound is not described in the literature.

The mother liquors were evaporated to dryness and recrystallized successively from methanol and from isopropyl ether and a yield of 20% of 3-methoxy-Δ$^{2,5(10)}$-estradiene-17α(1')-spiro-2'-oxirane having a melting point of 110° C. and a specific rotation $[\alpha]_D^{20} = +111°$ (c.=0.5% in dioxane) was obtained.

Calculated: C, 79.95%; H, 9.4%. Found: C, 80.1%; H, 9.6%.

The product is not described in the literature.

STEP B.—PREPARATION OF 3-METHOXY-17α-HYDROXYMETHYL-Δ$^{2,5(10)}$-ESTRADIENE-17β-OL 3 gm. of 3-methoxy-Δ$^{2,5(10)}$-estradiene-17β(1')-spiro-2'-oxirane from Step A were introduced into a solution of 30 cc. of ethanol, 6 cc. of water and 3 cc. of sodium hydroxide solution. The reaction mixture was heated to reflux for a period of 5 hours and then it was cooled and poured into 150 cc. of water. The aqueous mixture was extracted with 70 cc. of methylene chloride and the methylene chloride extract was washed with water, dried over magnesium sulfate and evaporated to dryness under vacuum. The raw residue was crystallized from ether to obtain 1.23 gm. (39% yield) of 3-methoxy-17α-hydroxymethyl-Δ$^{2,5(10)}$-estradiene-17β-ol having a melting point of 210° C. and a specific rotation $[\alpha]_D^{20} = +94°$ (c.=0.5% in dioxane).

The product occurred in the form of crystals and was slightly soluble in ether and soluble in chloroform and alcohol.

*Analysis.*—$C_{20}H_{30}O_3$: molecular weight=318.44. Calculated: C, 75.4%; H, 9.5%. Found: C, 75.5%; H, 9.5%.

This compound is not described in the literature.

STEP C.—PREPARATION OF 17α-HYDROXYMETHYL-Δ$^{2,5(10)}$-ESTRENE-17β-OL-3-ONE 1.23 gm. of 3-methoxy-17α-hydroxymethyl-Δ$^{2,5(10)}$-estradiene-17β-ol from Step B were agitated in 12 cc. of a 70% acetic acid solution until solution occurred. The reaction mixture was allowed to stand at room temperature for a period of 4 hours and then the mixture was diluted with methylene chloride. The methylene layer was decanted, washed with water, dried over magnesium sulfate and evaporated to dryness under vacuum. The raw residue was crystallized from ether to obtain 0.718 gm. (62% yield) of 17α-hydroxymethyl-Δ$^{5(10)}$-estrene-17β-ol-3-one having a melting point of 124° C.

The product occurred in the form of crystals which were slightly soluble in ether, soluble in alcohol and very soluble in chloroform.

This compound is not described in the literature.

STEP D.—PREPARATION OF 17α-HYDROXYMETHYL-Δ⁴-ESTRENE-17β-OL-ONE

The following mixture was heated to reflux for a period of one hour under an atmosphere of nitrogen, 1.1 gm. of 17α-hydroxymethyl-Δ$^{5(10)}$-estrene-17β-ol-3-one, 11.0 cc. of ethanol, 2.2 cc. of water and 1.1 cc. of sodium hydroxide solution. Thereafter the reaction mixture was extracted with 60 cc. of methylene chloride and the methylene chloride extract was washed with water, dried over magnesium sulfate and evaporated to dryness under vacuum to obtain 0.750 gm. (67% yield) of raw 17α-hydroxymethyl] - Δ⁴ - estrene-17β-ol-3-one. After crystallization from ether, the product had a melting point of 140° C. and a specific rotation $[\alpha]_D^{20} = +26.5°$ (c.=1% in chloroform).

It occurred in the form of crystals and was slightly soluble in ether, soluble in alcohol and very soluble in chloroform.

*Analysis.*—$C_{19}H_{28}O_3$: molecular weight=304.41. Calculated: C, 74.95%; H, 9.27%. Found: C, 75.1%; H, 9.4%.

This compound is not described in the literature.

EXAMPLE III

*Preparation of 20ξ-hydroxymethyl-5β-pregnane-3α,20ξ-diol*

STEP A.—2-(5β-ANDROSTAN-3α-OL-17β-YL)-2-METHYL-OXIRANE 16.5 gm. of trimethylsulfoxonium iodide were introduced into 165 cc. of dimethylformamide and 3.2 gm. of an oily suspension containing 50% sodium hydride were added thereto. The reaction mixture was agitated for a period of 20 minutes and then 5 gm. of 5β-pregnane-3α-ol-20-one were introduced. The reaction mixture was agitated for a further period of 24 hours at room temperature and thereafter it was poured into a mixture of water and ice. The precipitate was vacuum filtered and washed with water. The raw crystallizate was taken up with methylene chloride, dried over magnesium sulfate and evaporated to dryness under vacuum. After successive crystallizations from ether, ethyl acetate and methanol, 2-(5β-androstan-3α-ol-17β-yl)-2-methyl oxirane was obtained having a melting point of 178° C. and a specific rotation $[\alpha]_D^{20} = +23° \pm 2°$ (c.=0.5% in chloroform).

The product occurred in the form of colorless crystals and was slightly soluble in ether and soluble in alcohol and chloroform.

*Analysis.*—$C_{22}H_{36}O_2$: molecular weight=332.51. Calculated: C, 79.46%; H, 10.92%. Found: C, 79.4%; H, 10.9%.

This compound is not described in the literature.

STEP B.—20ξ-HYDROXYMETHYL-5β-PREGNANE-3α,20ξ-DIOL

By treating the 2-(5β-androstan-3α-ol-17β-yl)-2-methyl oxirane in aqueous ethanolic sodium hydroxide at reflux temperatures, according to the method described in Step B of Example II, 20ξ-hydroxymethyl-5β-pregnane-3α,20ξ-diol was obtained.

This compound is not described in the literature.

Various modifications of the process of the invention may be made without departing from the spirit or scope thereof and it is to be understood that the invention is to be limited only as defined in the appended claims.

We claim:

1. A process for the preparation of hydroxy-hydroxymethyl steroids which comprises reacting a steroid having a keto group in a position selected from the group consisting of the 3-, 17- and 20-position not conjugated with a double bond with the methylide of dimethylsulfoxonium to form the corresponding spiro-oxirane of the steroid and reacting the latter under alkaline conditions to form the corresponding hydroxy-hydroxymethyl steroid.

2. The process of claim 1 wherein reaction of the keto steroid with the said methylide is effected at room temperature in the medium used to prepare the said methylide.

3. A process for the preparation of 3ξ-hydroxymethyl-5β-androstane-3ξ,17β-diol which comprises reacting 17β-acetoxy-5β-androstane 3-one with the methylide of dimethyl sulfoxonium to form 17β-acetoxy-5β-androstane-3-spiro-2'-oxirane and hydrolyzing the latter under alkaline conditions to form 3ξ-hydroxymethyl-5β-androstane-3ξ, 17β-diol.

4. A process for the preparation of 17α-hydroxymethyl-Δ⁴-estrene-17β-ol-3-one which comprises reacting 3-methoxy-Δ²,⁵⁽¹⁰⁾-estradiene-17-one with the methylide of dimethyl sulfoxonium to form 3-methoxy-Δ²,⁵⁽¹⁰⁾-estradiene-17β(1')-spiro-2'-oxidrane, hydrolyzing the latter under alkaline conditions to form 3-methoxy-17α-hydroxymethyl-Δ²,⁵⁽¹⁰⁾-estradiene-17β-ol, reacting the latter under acidic conditions to form 17α-hydroxymethyl-Δ⁵⁽¹⁰⁾-estrene-17β-ol-3-one and isomerizing the latter under alkaline conditions to form 17α-hydroxymethyl-Δ⁴-estrene-17β-ol-3-one.

5. A process for the preparation of 20ξ-hydroxymethyl-5β-pregnane-3α,20ξ-diol which comprises reacting 5β-pregnane-3α-ol-20-one with the methylide of dimethyl sulfoxonium to form 2-(5β-androstan-3α-ol-17β-yl)-2-methyl-oxirane and hydrolyzing the latter under alkaline conditions to form 20ξ-hydroxymethyl-5β-pregnane-3α,20ξ-diol.

6. 3ξ-hydroxymethyl-5β-androstane-3ξ,17β-diol.

7. 3 - methoxy-17α-hydroxymethyl-Δ²,⁵⁽¹⁰⁾-estradiene-17β-ol.

8. 17α-hydroxymethyl-Δ⁵⁽¹⁰⁾-estrene-17β-ol-3-one.

9. 17α-hydroxymethyl-Δ⁴-estrene-17β-ol-3-one.

10. 20ξ-hydroxymethyl-5β-pregnane-3α,20ξ-diol.

11. 17β-acetoxy-5β-androstane-3-spiro-2'-oxirane.

12. 3 - methoxy-Δ²,⁵⁽¹⁰⁾-estradiene-17β(1')-spiro-2'-oxirane.

13. 3 - methoxy-Δ²,⁵⁽¹⁰⁾-estradiene-17α(1')-spiro-2'-oxirane.

14. 2 - (5β-androstan-3α-ol-17β-yl)-2-methyl-oxirane.

References Cited by the Examiner

UNITED STATES PATENTS 2,265,143   12/41   Butenandt et al. _____ 260—348

LEWIS GOTTS, *Primary Examiner.*

UNITED STATES PATENT OFFICE
CERTIFICATE OF CORRECTION

Patent No. 3,174,970                                         March 23, 1965

Georges Muller et al.

It is hereby certified that error appears in the above numbered patent requiring correction and that the said Letters Patent should read as corrected below.

Column 4, line 3, for "$\Delta^{2,5(10)}$" read -- $\Delta^{5(10)}$ --; line 30, for "methyl]" read -- methyl --; column 5, line 31, for "-oxidrane" read -- -oxirane --.

Signed and sealed this 10th day of May 1966.

(SEAL)
Attest:

ERNEST W. SWIDER                                                                 EDWARD J. BRENNER
Attesting Officer                                                                Commissioner of Patents